United States Patent
Even et al.

(10) Patent No.: US 9,531,776 B2
(45) Date of Patent: *Dec. 27, 2016

(54) MULTIMEDIA COMMUNICATION CONTROL UNIT AS A SECURE DEVICE FOR MULTIMEDIA COMMUNICATION BETWEEN LAN USERS AND OTHER NETWORK USERS

(71) Applicant: Polycom Israel, Ltd., Petach-Tikva (IL)

(72) Inventors: Roni Even, Tel Aviv (IL); Uri Rabinison, Marietta, GA (US)

(73) Assignee: Polycom, Inc., San Jose, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 14/191,139

(22) Filed: Feb. 26, 2014

(65) Prior Publication Data

US 2014/0181318 A1    Jun. 26, 2014

Related U.S. Application Data

(63) Continuation of application No. 10/362,382, filed as application No. PCT/IL01/00756 on Aug. 14, 2001, now Pat. No. 8,706,893.

(Continued)

(51) Int. Cl.
*H04L 29/06* (2006.01)
*G06F 15/16* (2006.01)
*H04L 12/28* (2006.01)

(52) U.S. Cl.
CPC .......... *H04L 65/60* (2013.01); *H04L 12/2801* (2013.01); *H04L 29/06027* (2013.01); *H04L 63/029* (2013.01); *H04L 65/1006* (2013.01); *H04L 65/1009* (2013.01); *H04L 65/1043* (2013.01); *H04L 65/1046* (2013.01);

(Continued)

(58) Field of Classification Search
CPC combination set(s) only.
See application file for complete search history.

(56) References Cited

U.S. PATENT DOCUMENTS 5,307,342 A * 4/1994 Georigiou .......... H04Q 11/0001
340/2.1
5,999,979 A * 12/1999 Vellanki .................. H04L 29/06
348/E5.008

(Continued)

FOREIGN PATENT DOCUMENTS

WO    97/28628    8/1997
WO    97/40610    10/1997

OTHER PUBLICATIONS

European Search Report received in parent corresponding Application No. EP01958354, dated Aug. 8, 2005, 4 pages.

(Continued)

*Primary Examiner* — Saket K Daftuar
(74) *Attorney, Agent, or Firm* — Blank Rome, LLP (57) ABSTRACT

A system and method for providing multimedia communication between a firewall protected, LAN based endpoint and an endpoint that is external to the LAN. A logical port of a multimedia communications control unit is attached to the LAN behind the firewall. Another logical port of the multimedia communications control unit is attached to the external endpoint. Multimedia communication data, consisting of call management data and media data, can be exchanged between the endpoints via the multimedia.

19 Claims, 3 Drawing Sheets

Related U.S. Application Data (60) Provisional application No. 60/225,331, filed on Aug. 15, 2000.

(52) U.S. Cl.
CPC ........ H04L 65/1069 (2013.01); H04L 65/607 (2013.01); H04L 65/608 (2013.01)

(56) References Cited

U.S. PATENT DOCUMENTS

| | | | |
|---|---|---|---|
| 6,078,961 A | 6/2000 | Mourad et al. | |
| 6,115,356 A * | 9/2000 | Kalkunte | H04L 12/5602 370/229 |
| 6,128,653 A | 10/2000 | Del Val et al. | |
| 6,192,422 B1 * | 2/2001 | Daines | H04L 12/46 709/232 |
| 6,202,081 B1 | 3/2001 | Naudus | |
| 6,256,687 B1 * | 7/2001 | Ellis | G06F 13/385 710/53 |
| 6,295,276 B1 * | 9/2001 | Datta | H04L 29/12009 370/218 |
| 6,347,334 B1 * | 2/2002 | Fredericks | H04L 49/357 370/244 |
| 6,353,332 B1 * | 3/2002 | Brelet | G11C 15/04 326/40 |
| 6,421,674 B1 * | 7/2002 | Yoakum | H04L 29/06027 |
| 6,496,216 B2 | 12/2002 | Feder et al. | |
| 6,631,416 B2 * | 10/2003 | Bendinelli | H04L 12/2602 709/217 |
| 6,633,985 B2 | 10/2003 | Drell | |
| 6,671,263 B1 * | 12/2003 | Potter | H04M 3/51 370/261 |
| 6,711,171 B1 * | 3/2004 | Dobbins | H04L 12/1886 370/400 |
| 6,754,713 B1 * | 6/2004 | Dascalu | H04L 29/06 709/224 |
| 6,757,005 B1 | 6/2004 | Elbaz et al. | |
| 6,779,039 B1 * | 8/2004 | Bommareddy | H04L 29/12009 709/226 |
| 6,937,612 B1 * | 8/2005 | Mauger | H04L 29/06 370/465 |
| 7,039,922 B1 * | 5/2006 | Shah | G06F 13/4022 710/1 |
| 7,146,410 B1 * | 12/2006 | Akman | H04L 29/125 370/249 |
| 7,239,629 B1 * | 7/2007 | Olshansky | H04Q 3/0045 370/353 |
| 7,286,502 B1 * | 10/2007 | Rao | G06F 3/023 370/328 |
| 7,441,270 B1 * | 10/2008 | Edwards | H04L 63/029 709/206 |
| 2001/0056549 A1 | 12/2001 | Pinault et al. | |
| 2002/0026503 A1 * | 2/2002 | Bendinelli | H04L 12/2602 709/220 |
| 2002/0099937 A1 * | 7/2002 | Tuomenoksa | H04L 12/2602 713/153 |
| 2002/0120760 A1 * | 8/2002 | Kimchi | H04L 29/06 709/230 |
| 2003/0110379 A1 * | 6/2003 | Ylonen | H04L 12/4604 713/164 |
| 2003/0131263 A1 * | 7/2003 | Keane | H04L 12/4641 726/15 |
| 2003/0158962 A1 * | 8/2003 | Keane | H04L 12/4641 709/238 |

OTHER PUBLICATIONS

Christoph Rensing, et al., "VDMFA, eine verteilte dynamische Firewallarchitectur fuer Multimedia-Dienste," Tu Darmstadt, Mar. 31, 1999, 14 pages.

Lodin S. W., et al., "Firewalls Fend Off Invasions from the Net," IEE Spectrum, vol. 35, No. 2, Feb. 1998, pp. 26-34.

Carolyn Duffy Marsan, "Veteran Protocol Lands New Role as Multimedia Star," Network World, Sep. 1999, pp. 7, 120.

Carolyn Duffy Marsan, "How Socks Fit," Sep. 1999, p. 120.

\* cited by examiner

Prior Art

MULTIMEDIA COMMUNICATION CONTROL UNIT AS A SECURE DEVICE FOR MULTIMEDIA COMMUNICATION BETWEEN LAN USERS AND OTHER NETWORK USERS

CROSS REFERENCE TO RELATED APPLICATIONS

This application is a continuation of U.S. patent application Ser. No. 10/362,382, filed Oct. 6, 2003, titled "Multimedia Communication Control Unit as a Secure Device for Multimedia Communication Between Lan Users and Other Network Users", which is a national stage entry of PCT Application No. PCT/IL01/00756, filed Aug. 14, 2001, which claims priority from U.S. Provisional Application No. 60/225,331, filed Aug. 15, 2000, the entire contents of all of which are incorporated herein by reference for all purposes.

TECHNICAL FIELD

This disclosure relates to the field of secure communications and, more particularly, to secure multimedia communication to and from a LAN using H.323 protocol or similar protocol.

BACKGROUND OF THE DISCLOSURE

The age of the "Jetsons" has arrived. Video conferencing and other multimedia communication is now a common place commodity. With the advent of personal computer based video conferencing capabilities, the capability of multimedia communication between devices housed on local area networks (LAN) is essential. One primary concern today is allowing parties to participate in network based video conferencing without compromising the security of their respective networks.

One way to secure a LAN is by using a firewall. A firewall is a system that protects a LAN that is connected to a public network, such as the Internet, from unauthorized access. One example of a firewall is Firewall-1 marketed by Check Point.

Figure 1:
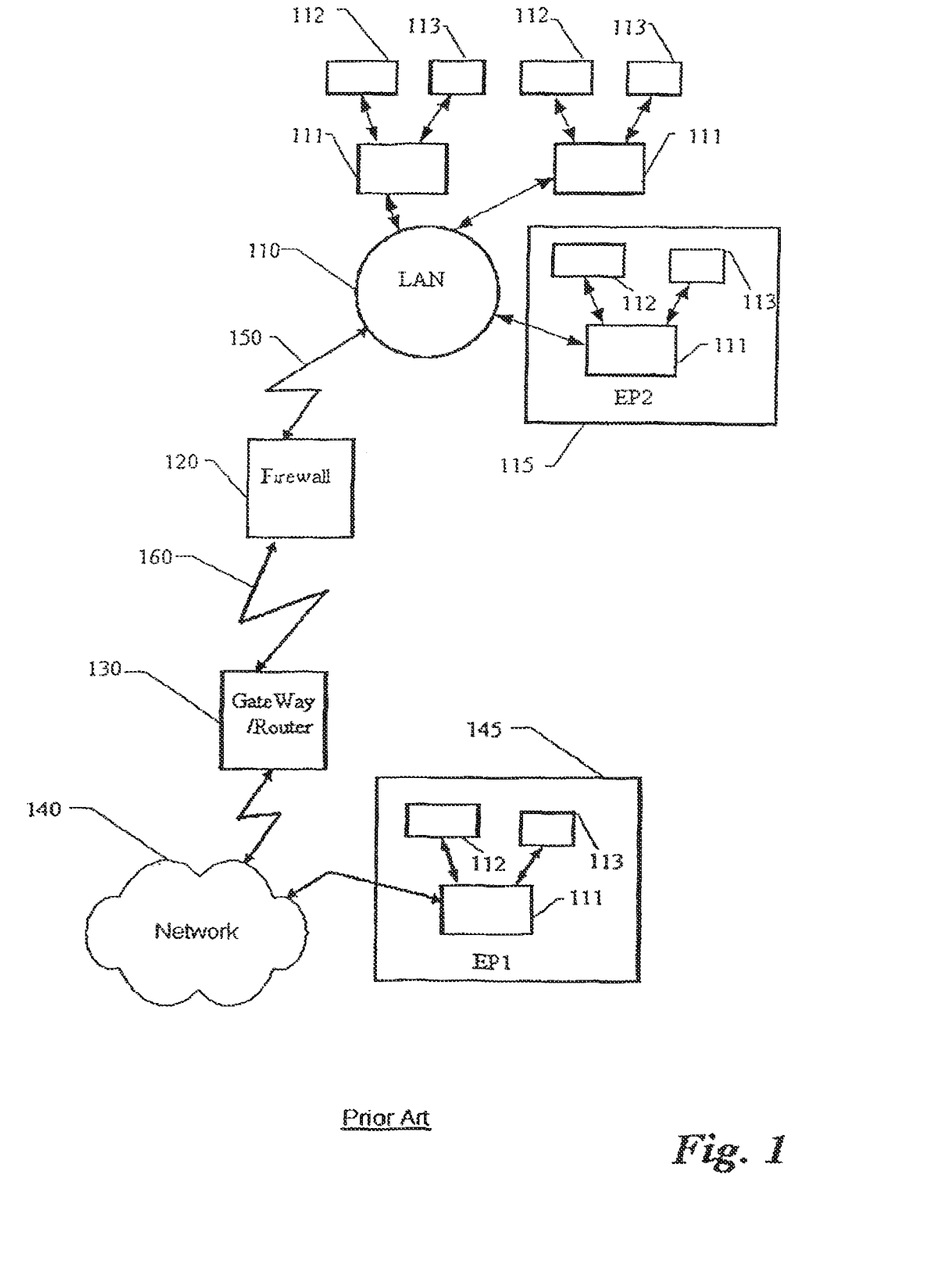
FIG. 1 is a system diagram illustrating a typical network configuration.

FIG. 1 is a system diagram illustrating a typical network configuration. A LAN 110 is shown to include computers 111 with a video camera 112 and/or microphone & speakers 113 connected to each computer 111. These computers 111, like EP2 115, may participate in a multimedia communication and conferencing session by utilizing a communication protocol such as the H.323 Protocol or the Session Initiation Protocol (SIP). Detailed information regarding H.323 protocol can be found on ITU's site: www.itu.org. SIP is an application-layer control or signaling protocol that operates to create, modify, and terminate sessions with one or more participants. More information about SIP Currently Proposed Std. RFC 2543 might be found in www.ietf.org. In addition, the computers 111, like EP1 145, may enter a multimedia communication and conferencing session with entities located external to the LAN 110 (i.e., located on the Internet), through an IP Gateway/router 130.

A multimedia communications session based on the H.323 protocol or a similar protocol, typically includes two major groups of data streams. One group of data streams is the call management data streams. The call management data streams include call set-up, call control, call tear-down, information, etc. that is used to manage a session. A second group of data streams is the call media data streams. The call media data streams include the audio and video data or multimedia data that comprises the information exchanged during the multimedia communications session.

In typical configuration as depicted in FIG. 1, the call management and call media data streams for a multimedia communications session with an entity external to the LAN will need to travel over communication lines 150 to the firewall 120 and then over communication line 160 to an IP Gateway/router 130, via Internet 140 to EP1 145. Thus, it is apparent that a computer that resides on a firewall protected LAN may need to engage in a multimedia session with a computer external to the LAN.

For security reasons, network managers on IP networks usually want to restrict external access to their networks. Most of the time they will only open TCP ports for Telnet, FTP, and some other common services. To accomplish this, the network managers will configure their IP routers (sometimes referred to as gateways) to filter out access to different ports. These filters are commonly referred to as firewalls. IP security firewalls may be configured in a way that does not allow unauthorized connections.

In order for a broad array of devices to access a firewall-protected network, the network manager must open certain TCP/UDP (User Datagram Protocol) ports required by the accessing device. Part of the call management and call media data streams utilized by most video conferencing equipment utilize dynamic TCP/UDP ports. For these data streams to pass through a firewall, the firewall must be compatible with the H.323, or any other applicable protocol, and open the appropriate TCP/UDP ports that are necessary for a particular session. If this is not performed, the firewall typically will block portions of the multimedia data stream and thus, drop desirable audio/video data.

Another concern is that for each TCP/UDP port that is opened, a potential security breach of the firewall through which adverse parties may exploit the protected network is created. Thus, there is a need in the art for a technique to allow devices on firewall protected networks to communicate with each other without breaching the security of the firewall or without losing important data.

Only a few techniques have been utilized as an attempt to address this need in the art. One such technique is to build an additional separate LAN that is dedicated to audio/video communication. The dedicated LAN hosts only video/audio endpoints (e.g. a terminal on a network capable of two way audio and/or video communication with other endpoints). The dedicated LAN is connected directly to a public network without a firewall. Thus, a multimedia communications session can be entered by a device attached to the dedicated LAN without decreasing the security of the main LAN. This technique is inadequate since it completely eliminates the benefit sought after by having a LAN in the first place—interconnected equipment. The use of a separate network isolates the audio/video equipment and increases the over all cost of the network and network management.

Another technique is to utilize a firewall that supports multimedia communication by being compatible with a communication protocol like H.323 or a similar protocol. This technique allows multimedia communication data streams to pass into and out of the LAN. However, a firewall that is compatible with communication standards such as H.323 or a similar protocol would be complex to create, as well as cost prohibitive. Thus, the use of a customized firewall that supports a complicated communications protocol such as the H.323 protocol is not a viable technique to solve the problems in the art.

Another technique that may be employed is to create "holes" in the firewall enabling the multimedia communications data stream to penetrate through the firewall. For example, the firewall may be configured to allow access to all UDP ports. This approach reduces the security of the LAN, because it opens up more holes in the LAN, which may allow unauthorized use of the LAN.

Therefore, there is a need in the art for a system and method to handle multimedia communications without building a separate LAN for strictly carrying the video/audio communications without a firewall. There is further a need in the art to handle multimedia communications without having to upgrade a conventional firewall to handle the H.323 protocol or similar protocol. It is therefore evident that there is a need in the art to allow LAN connected computers to securely communicate with other computers external to the LAN, without diminishing the security of the LAN.

SUMMARY

The present disclosure explains a system for providing secured multimedia communication between a plurality of endpoints belonging to more then one network. Basically, each endpoint connected to a network is able to make connection to an endpoint on the LAN using that endpoint's IP address. In addition, the connection may be made in the reverse direction. Once a connection has been established between the endpoints, a multimedia conferencing session may begin. Each endpoint is operative to send multimedia packets via its network and to receive multimedia packets from that network.

The presently disclosed embodiments can allow video conferencing of an endpoint being hosted on a LAN with endpoints that are located external to the LAN without compromising the security of the LAN. Similar to the existing architecture, there is usually at least one video camera, or video source, and/or a microphone and speakers included with the each endpoint. The video source generates multimedia communication data streams. A typical LAN firewall is not able support multimedia communications without breaching the security provided by the firewall. The presently disclosed embodiments can include a multimedia communication control unit that enables the multimedia communications sessions with a device external to a secured LAN without compromising the security of the LAN. The multimedia communication control unit of the present disclosure includes a control unit, a common interface, and a plurality of input/output logical ports and, is operative to only allow data that strictly conforms to the supported communications protocol (i.e., the H.323 protocol, SIP) to pass into and out of the LAN. Thus, the security of the LAN is not compromised yet, multimedia communications with a device external to the LAN can be accomplished.

In one embodiment of the present disclosure, an endpoint located external to a LAN may enter into a multimedia communications session with an endpoint on the LAN by passing all information through the multimedia control unit. The multimedia communication control unit facilitates the connection between the aforementioned endpoints. The external endpoint generates a call management data stream to the LAN based endpoint in an attempt to setup the session. The call management data stream would proceed to the multimedia communication control unit via an input/output ("I/O") logical port. Each I/O logical port has its own IP address for receiving data. Within the multimedia communication control unit the call management and data streams are transferred to a control unit through a common interface. Once the control of the call has been established, the communications between the two endpoints would take a similar route. Thus, the media data streams would also pass through the multimedia communications control unit.

Figure 2:
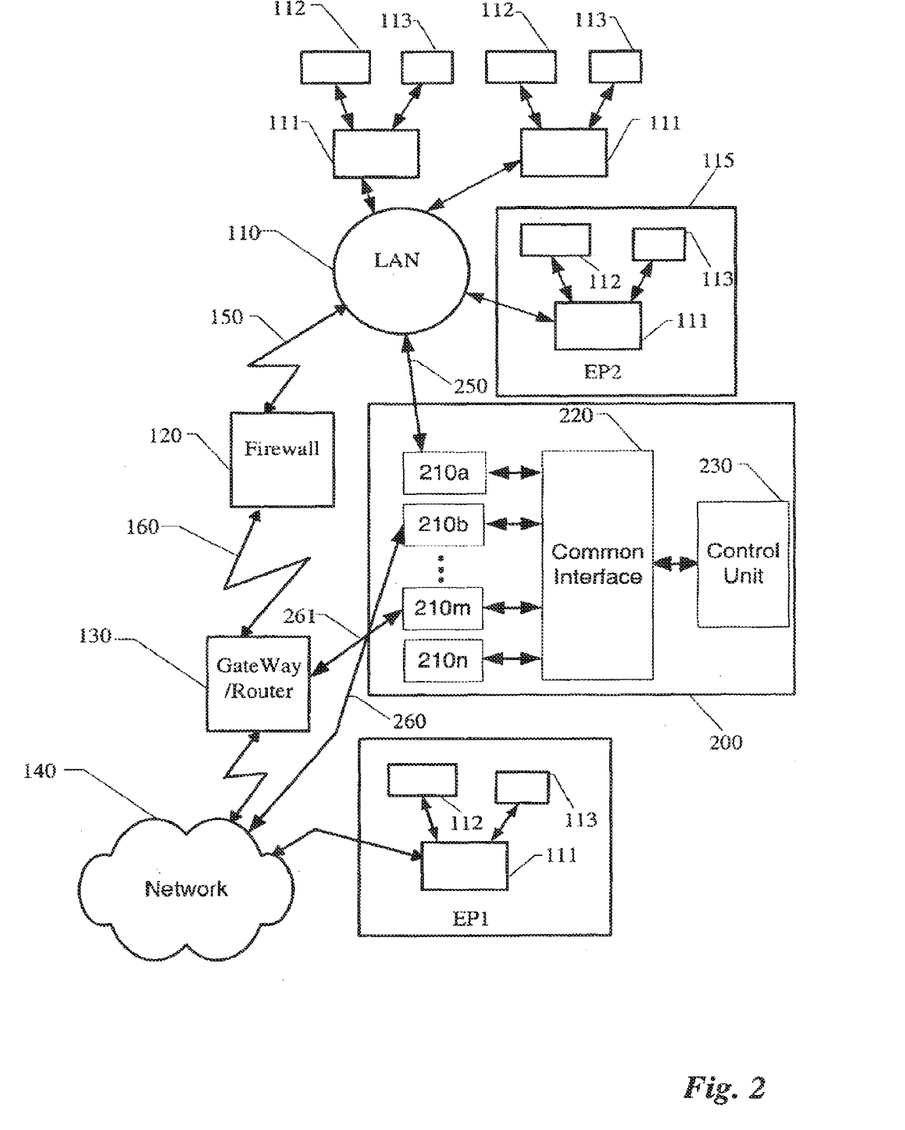
FIG. 2 is a system diagram of an exemplary embodiment of the present disclosure.

In another embodiment of the present disclosure, the call management data streams are transferred from an endpoint external to the LAN via a gateway/router and enters the LAN through a firewall 120. The call management data streams are further transferred to the multimedia communications control unit so that the multimedia session can be established. Thus, in this embodiment of the present disclosure, the call management data streams follow the traditional path but, once the multimedia session is setup with the multimedia communications control unit, the media data streams by pass the firewall and only travel through the multimedia communications control unit.

DETAILED DESCRIPTION

The presently disclosed embodiments can provide a solution to the above-described needs in the art by providing a method for a LAN connected computer to engage in a multimedia communications session with another computer external to the LAN without compromising the security of the LAN. More specifically, the present disclosure utilizes a communication control unit that is connected to a firewall protected LAN. The communication control unit allows multimedia communication streams to pass into and out of the LAN to other devices located external to the LAN. However, because the communication control unit will only allow multimedia communication streams that strictly conform to a particular communications protocol, such as the H.323 protocol, SIP, the security of the LAN is not compromised. Thus, data streams can be diverted around the firewall through the communication control unit.

Now turning to the figures where like numerals refer to like elements, various aspects, features and enabling embodiments of the present disclosure are provided.

FIG. 2 is a system diagram of an exemplary embodiment of the present disclosure. In the illustrated embodiment, a multimedia communication control unit 200 is connected to a LAN 110 via a communication line 250, a public network 140 through communication path 260, and a gateway/router 130 through communication path 261. The multimedia communication control unit 200 is a device located in a node of a network that receives several channels from access ports, according to H.323 or similar protocol. The H.323 multimedia communication control unit 200 processes the multimedia signals and distributes them to connected channels. The multimedia communications control unit 200 can be an MCU, a gateway, or other any of a variety of video/communications equipment. In fact, the multimedia communications control unit 200 can be a dedicated device that simply supports the passage of a particular communication protocol, such as H.323, SIP, and filters all other communications. One example of a multimedia communication control unit is the MCU MGC-100 in H.323 configuration manufactured and marketed by Polycom. Additional information can be obtained about this example from www.polycom.com.

The multimedia communication control unit 200 includes several input/output logical ports 210a-210n. Each input/output logical ports 210a-210n may serve more than one Endpoint, which is connected to a network that the input/output logical port is connected to. Each input/output logical port has a different IP address and can be connected to a network such as a LAN 110 or to a public network 140 using H.323 formatted communications or some similar standard. For example, input/output logical port 210a is connected to the LAN 110 and input/output logical port 210b is connected to the Internet 140.

In an exemplary multimedia communications control unit, all the input/output logical ports 210 are connected to a common interface (CI) 220. The CI 220 operates as a routing unit between the input/output logical ports. The CI 220 can be implemented as a bus (e.g., a TDM bus, a serial bus, an optical bus, an ATM bus, any combination of those buses or the like), through direct connection, or through another mechanism such as shared memory. Other techniques to interconnect the input/output ports may also be used and the specific examples provided are intended only to be illustrative and are no a limitation of the different techniques that may be implemented.

A control unit 230 coordinates the operation of multimedia communication control unit 200 by managing the input/output logical ports 210a-210n, the common interface 220, the call management and the call control of the multimedia communication sessions. Said control unit 230 may include an internal routing table between the different input/output logical ports 210a-210n.

In one exemplary embodiment of the present disclosure, the multimedia communications control unit operates as the path for the call management and call media data streams. Although the data exchanged is described as streams, it should be understood that the stream may include compressed multimedia packets, packet switched data, circuit switched data and other transmission techniques. In this embodiment, the call management streams and the media streams are sent from a source endpoint to a destination endpoint through the multimedia communications control unit. For example, a first endpoint 145 connected to a public network 140 may enter a multimedia communications session with a second endpoint 115 connected to a LAN 110. In this scenario, the data streams will flow from the first endpoint 145, through the public network 140 and to an input/output port 210b of the multimedia communications control unit 200 via communication path 260. The data streams that conform to the appropriate protocol will be sent out of the multimedia communications control unit 200 via CI 220 through an input output port 210a. Finally the data stream will arrive at the second endpoint 115 connected to the LAN 110.

In another embodiment of the present disclosure, the firewall 120 is part of the path of the call setup from the external EP1 145. For example, a first endpoint 145 connected to a public network 140 may enter into a multimedia communications session with a second endpoint 115 connected to a LAN 110. In this example, the call setup data stream, which typically does not require the use of dynamic TCP/UDP ports, will flow from the first endpoint 145, through the public network 140 to a gateway/router 130. The call setup data stream will then be communicated to a firewall 120 controlling access to LAN 110 through communication path 160. The call management data stream is passed to the LAN 110 via communication path 150. Finally, the call setup data stream is routed to the multimedia communication control unit 200 to input/output port 210a.

The rest of the call management streams, e.g. call control, and the media stream are transmitted from network 140 over communication path 260 through input/output port 210b.

The advantage of this case is that the media stream is routed through the multimedia communications control unit 200 while the call setup stream is authenticated by the firewall 120 before being routed to multimedia communications control unit 200. In both of these embodiments, inside the multimedia communications control unit 200, the call management data streams are routed to the control unit 230, which manages the call based on the applicable protocol.

The following are illustrative flow examples of an exemplary embodiment of the present disclosure.

Call Flow 1.

In this example the multimedia communications control unit 200 has a physical connection 261 to a gateway/router 130 to the DMZ and a physical connection 250 to the protected zone. The DMZ is an mnemonic for a demilitarized zone and in this context means a connection that is external to the firewall 120 and connected to an external network. The protected zone is area that connects to the LAN 110 via the firewall 120 and is protected by the firewall 120.

The external connection 261 is used for call management and for media transport coming from the external network via gateway/router 130. An endpoint EP1 145, which is connected in the external network 140, is calling an end point EP2 115, which is connected to the internal network 110.

The call signaling address of the multimedia communications control unit 200 is configured in the gateway/router 130 to go directly to the multimedia communications control unit 200 via connection 261.

Endpoint EP1 145 calls the multimedia communications control unit 200 and gives the alias address of endpoint EP2 115 as the final address. The router gets the call management and routes the call via communication line 261 to multimedia communications control unit 200, which establishes the call on both side. All connections to endpoint EP1 145 are handled via gateway/router 130, connection 261, I/O module 210m and to endpoint EP2 115 via connection 250 and input/output logical port 210a.

Call Flow 2.

In this example, the multimedia communications control unit 200 has a physical connection 261 to the gateway/router 130 to the DMZ and a physical connection 250 to the protected zone. The call setup address of the multimedia communications control unit 200 is configured in the router 130 to go to the firewall 120 via line 160, the firewall 120 will be configured to allow the call setup stream to the call setup ports of the multimedia communications control unit 200, to Input/Output logical port 210a. This port may be the application protocol well known call setup port. From the firewall 120 the call set up stream continues to the LAN 110, and from the LAN 110 to the Multimedia Communication Control Unit 200 via the line 250. This is a different IP address then the address that will be used after the connection is established, for opening dynamic channels that will be routed by the router 130 directly to the multimedia communications control unit 200 via line 261 and not via the Firewall 120 and the LAN 110.

Endpoint EP1 145 calls the endpoint EP2 115 via the call signaling address of the multimedia communications control unit 200 giving the alias address of endpoint EP2 115 as the final destination. The router 130 routes the call management message to the firewall 120 that verifies the source and directs the message via communication lines 150 to the LAN 110 and to the multimedia communications control unit 200 via communication Lines 250. The multimedia communications control unit 200 establishes a connection to endpoint EP2 115 on the internal network. After connection establishment, the rest of the channels that needs to be opened between endpoint EP1 145 and multimedia communications control unit 200 are made through communication lines 261 and router 130.

When the input/output logical port 210a *connected to the LAN* 110 *recognizes an H*.323 or similar communication with the appropriate IP number, for example from one or more users 111, it reads and process the video/audio data based on H.323 or similar protocol. The processed video/audio is transferred to the data routing unit via the common interface 220, to the appropriate logical input/output logical port 210, for example, 210b which process the data and transfer it using H.323 protocol or similar protocol via the Internet 140 to its destination.

Communication can be initialized from both directions: from the Internet 140 to the LAN 110 user as described above or vice versa. When the input/output logical port 210b or 210m connected to the Internet 140 recognizes an H.323 or similar communication to at least one of the LAN 110 members 111 connected to Input/output logical port 210a, it reads it, process the Video/Audio data based on H.323 or similar protocol, and transfers the processed data via the Routing unit 220 to the appropriate input/output logical ports 210a. The appropriate input/output logical ports 210a processes the data and transfers it, using H.323 or similar protocol, via the LAN 110 to its destination (for example one or more of users 111).

Figure 3:
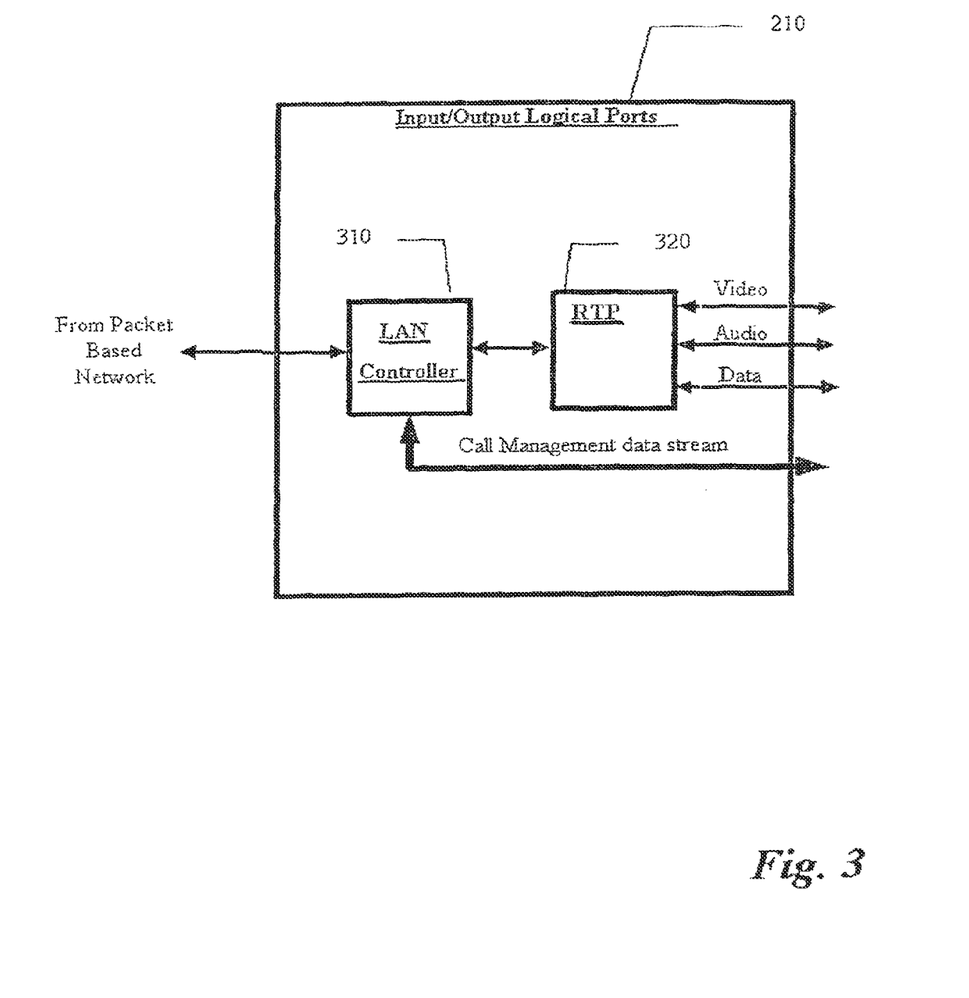
FIG. 3 is a block diagram of an exemplary embodiment of an input/output logical port for a multimedia communications control unit.

FIG. 3 is a block diagram of an exemplary embodiment of an input/output logical port 210. An exemplary input/output logical port comprises a LAN controller 310, connected to the real time processor (RTP) unit 320. The LAN controller 310 receives the packets from the network, processes them according to Ethernet protocol and Internet Protocol, then transfers the stream of packets to the RTP unit 320.

The RTP 320 processes the stream of packets based on the multimedia standards like, but not limited to, H.323; SIP into three type of streams:

(1) Compressed Audio stream (e.g., G.711: G.729; G.723.1);

(2) Compressed Video stream (e.g., H.261; H.263; MPEG); and (3) Data: (e.g., T.120).

Those streams are routed to another input/output logical port via a routing unit or common interface 220. In case additional functionality is required from the multimedia communications control unit 200, there are more internal units added. For example, if the functionality of stream transcoding is needed, a transcoding unit will be added to process the compressed media and translate the incompatible streams. Those additional units are well known in the art and are not in the scope of this disclosure.

The Call Management stream (e.g. H.245) will be routed to the control unit 230.

In the opposite direction, the input/output logical port 210 receives the appropriate streams, which are routed to it from another input/output logical port via the common interface 220. The RTP 320 creates a stream of packets according to the application protocol like H.323, SIP etc, and transfers them to the LAN controller 310. The LAN controller 310 processes them according to the communication standard, and sends the processed packets to the network.

In the new configuration proposed in this embodiment at least one input/output logical port, for example 210a, is dedicated to one LAN 110 and at least one other input/output logical port, for example 210b, is dedicated to another network such as the Internet 140. Because the multimedia communication control unit 220 has more than two input/output logical ports, it can simultaneously be connected to more than two networks.

The internal process of "depacketizing" and "packetizing" audio/video and data based on H.323 or similar protocol enables a secure communication to a LAN without affecting the firewall, which continues protecting the LAN from unauthorized access. The multimedia communication control unit 200 acts as a firewall to secure the LAN for multimedia conference by filtering and transferring only information that is using H.323 or similar protocols, that are protocols for multimedia conference and will block any other data or commands. It should be noted that in normal operation, a multimedia communication control unit is only connected to a single network; however, in the proposed embodiment it is connected to two or more networks.

A multimedia communication control unit that can be used in the embodiments of this disclosure generally comprises at least the following:

(a) A multiple input/output logical port architecture with at least two or more input/output logical ports;

(b) Each input/output logical port having a different IP address;

(c) The ability to process H.323 or other functionally similar protocols; and (d) The ability to block all other protocols from being processed by any input/output logical ports that were selected to support communication like H.323 or similar protocol. The Input/Output logical ports reject any protocol that is not the allowed application protocol. Further more the multimedia communication control unit 200 analyzes every packet including the media data streams verifies that it is a true protocol packet.

Thus it may be seen that the presently disclosed embodiments advantageously provide secured multimedia communication between a LAN based endpoint that is residing behind a firewall and an endpoint external to the firewall. The existing level of security of the LAN provided by the firewall is not compromised while the multimedia communication control unit processes media streams. In one of the exemplary embodiments, the external call management streams are transferred and processed by the multimedia communication control unit. The system forces the input/output logical port, which is dedicated to H.323 or similar communication, to support only H.323 or similar protocol, and therefore it isolates the internal LAN, from any other protocol. The system is able to handle a greater number of video conferencing calls in comparison to the conventional configuration.

The present disclosure has been described in relation to particular embodiments which are intended in all respects to be illustrative rather than restrictive. Those skilled in the art will understand that the principles of the presently disclosed embodiments may be applied to, and embodied in, hardware, software, or a combination of both, for operation on differing types of devices, regardless of the application.

Alternate embodiments will become apparent to those skilled in the art to which the present disclosure pertains without departing from its spirit and scope. Accordingly, the scope of the present invention is described by the appended claims and supported by the foregoing description.

What is claimed is:

1. A method for facilitating multimedia communication between a first endpoint on a first network secured by a firewall and a second endpoint on a second network external to the firewall, the method comprising:
   routing a call setup message via the firewall to a hardware multimedia communications control unit, comprising one or more processors, for setting up a call between the first endpoint and the second endpoint;
   receiving, at a first logical port of the multimedia communications control unit after setting up the call, an indication of multimedia data streams between the first endpoint and the second endpoint, the multimedia communications control unit communicatively coupling the first and second network with a secure communication path that does not go through the firewall;
   selecting a multimedia data stream received at the first logical port that conforms to a multimedia communications protocol;
   providing the selected multimedia data stream to a common interface of the multimedia communications control unit, the common interface communicatively coupling the first logical port and a second logical port of the multimedia communications control unit via the secure communication path; and
   initiating transfer of the selected conforming multimedia data streams by the multimedia communications control unit via the second logical port to the second endpoint.

2. The method of claim 1, wherein the indication of multimedia data streams is provided by the firewall to the multimedia communications control unit after the firewall processes a call setup.

3. The method of claim 1, wherein the first logical port has a first Internet Protocol address and the second logical port has a second Internet Protocol address that is different than the first Internet Protocol address.

4. The method of claim 1, wherein the multimedia communications protocol comprises H.323.

5. The method of claim 1, wherein the multimedia communications protocol comprises Session Initiation Protocol.

6. The method of claim 1, wherein only multimedia data streams conforming to the multimedia communications protocol are provided to the common interface from either the first logical port or the second logical port.

7. A multimedia communications control unit configured to facilitate multimedia communication to a first endpoint on a first network secured by a firewall, comprising:
   a first logical port communicatively coupled to the first network;
   a second logical port communicatively coupled to a second network, the second network external to the firewall; and
   one or more processors, wherein the one or more processors are configured to:
      receive a call setup message from the first endpoint via the firewall;
      receive, at the second logical port after call setup, an indication of multimedia data streams between a second endpoint on the second network and the first endpoint on the first network, the multimedia communications control unit communicatively coupling the first and second network with a secure communication path that does not go through the firewall;
      select a multimedia data stream received at the second logical port that conforms to a multimedia communications protocol;
      provide the selected multimedia data stream to a common interface of the multimedia communications control unit, the common interface communicatively coupling the second logical port and the first logical port of the multimedia communications control unit; and
      initiate transfer of the selected multimedia data stream via the first logical port to the first endpoint via the secure communication path.

8. The multimedia communications control unit of claim 7, wherein the indication of multimedia data streams is provided by the firewall to the multimedia communications control unit after the firewall processes a call setup.

9. The multimedia communications control unit of claim 7, wherein the indication of multimedia data streams is provided by the multimedia communications control unit as part of the multimedia communications control unit processing a call setup.

10. The multimedia communications control unit of claim 7, wherein the first logical port has a first Internet Protocol address and the second logical port has a second Internet Protocol address that is different than the first Internet Protocol address.

11. The multimedia communications control unit of claim 7, wherein the multimedia communications protocol comprises H.323.

12. The multimedia communications control unit of claim 7, wherein the multimedia communications protocol comprises Session Initiation Protocol.

13. The multimedia communications control unit of claim 7, wherein only multimedia data streams conforming to the multimedia communications protocol are provided to the common interface from either the first logical port or the second logical port.

14. A non-transitory computer readable medium comprising instructions stored thereon to configure a processor to facilitate multimedia communication between a first endpoint on a first network secured by a firewall and a second endpoint on a second network external to the firewall, wherein the instructions when executed cause the processor to:
   receive, at a second logical port communicatively coupled to the second network, an indication of multimedia data streams between the second endpoint and the first endpoint after the firewall processes a call setup;
   select a multimedia data stream received at the second logical port that conforms to a multimedia communications protocol;
   provide the selected multimedia data stream to a common interface communicatively coupling the second logical port and a first logical port, the first logical port communicatively coupled to the first network; and
   initiate transfer of the selected multimedia data stream through the first logical port to the first endpoint via a secure communication path that does not go through the firewall.

15. The non-transitory computer readable medium of claim 14, wherein the indication of multimedia data streams is provided by the processor as part of the processor processing the call setup.

16. The non-transitory computer readable medium of claim 14, wherein the first logical port has a first Internet Protocol address and the second logical port has a second Internet Protocol address that is different than the first Internet Protocol address.

17. The non-transitory computer readable medium of claim 14, wherein the multimedia communications protocol comprises H.323.

18. The non-transitory computer readable medium of claim 14, wherein the multimedia communications protocol comprises Session Initiation Protocol.

19. The non-transitory computer readable medium of claim 14, wherein only multimedia data streams conforming to the multimedia communications protocol are provided to the common interface from either the first logical port or the second logical port.

* * * * *